(12) United States Patent
Tavassoli

(10) Patent No.: US 11,222,358 B2
(45) Date of Patent: Jan. 11, 2022

(54) FACILITATION OF ARTIFICIAL INTELLIGENCE PREDICTIONS OF TELECOMMUNICATIONS CUSTOMERS

(71) Applicant: AT&T Intellectual Property I, L.P., Atlanta, GA (US)

(72) Inventor: Vahid Tavassoli, Alpharetta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 16/887,615

(22) Filed: May 29, 2020

(65) Prior Publication Data

US 2021/0374803 A1  Dec. 2, 2021

(51) Int. Cl.
| | | |
|---|---|---|
| *G06Q 30/00* | (2012.01) | |
| *G06Q 30/02* | (2012.01) | |
| *G06Q 50/00* | (2012.01) | |
| *G06N 20/00* | (2019.01) | |
| *G06Q 50/26* | (2012.01) | |

(52) U.S. Cl.
CPC ......... *G06Q 30/0255* (2013.01); *G06N 20/00* (2019.01); *G06Q 30/0185* (2013.01); *G06Q 30/0269* (2013.01); *G06Q 50/01* (2013.01); *G06Q 50/265* (2013.01)

(58) Field of Classification Search
None
See application file for complete search history.

(56) References Cited

U.S. PATENT DOCUMENTS

| | | |
|---|---|---|
| 7,890,581 B2 | 2/2011 | Rao et al. |
| 7,991,764 B2 | 8/2011 | Rathod |
| 8,832,092 B2 | 9/2014 | Spivack et al. |
| 9,049,259 B2 | 6/2015 | Rathod |
| 9,530,167 B2 | 12/2016 | Tseng |
| 9,654,591 B2 | 5/2017 | Matus |
| 9,665,885 B1 | 5/2017 | Allouche |
| 10,217,117 B2 | 2/2019 | Heath |
| 10,402,750 B2 | 9/2019 | Weston et al. |
| 10,929,890 B2* | 2/2021 | Knab .................. G06F 16/9535 |
| 2004/0083146 A1* | 4/2004 | Goodwin ............... G06Q 30/02 705/34 |

(Continued)

FOREIGN PATENT DOCUMENTS

| | | |
|---|---|---|
| CN | 110807091 A | 2/2020 |
| EP | 3451252 A1 | 3/2019 |

OTHER PUBLICATIONS

STIC EIC 3600 Search Report for U.S. Appl. No. 16/887,615 dated Apr. 20, 2021 (Year: 2021).*

(Continued)

*Primary Examiner* — Matthew T Sittner
(74) *Attorney, Agent, or Firm* — Amin, Turocy & Watson, LLP

(57) ABSTRACT

Machine learning (ML) can be used to gather data on prospective customers from publicly available online sources. The ML can provide data on a likelihood of near future, customers and subscribers and a list of people with low interest in the company's products. The ML system can be recursively updated as new public data becomes available online. Thus, the ML system can be used to generate targeted advertising and root cause analysis based on a relationship between people's statuses and their respective interests in certain products and/or services.

20 Claims, 10 Drawing Sheets

(56) References Cited

U.S. PATENT DOCUMENTS

| | | | |
|---|---|---|---|
| 2009/0138342 A1* | 5/2009 | Otto | G06N 5/025 |
| | | | 706/45 |
| 2009/0182589 A1 | 7/2009 | Kendall et al. | |
| 2011/0191417 A1 | 8/2011 | Rathod | |
| 2012/0030734 A1* | 2/2012 | Wohlert | H04W 60/00 |
| | | | 726/4 |
| 2012/0036015 A1 | 2/2012 | Sheikh | |
| 2012/0066082 A1* | 3/2012 | Sadler | G06Q 30/0601 |
| | | | 705/26.1 |
| 2014/0019542 A1 | 1/2014 | Rao et al. | |
| 2014/0058826 A1 | 2/2014 | Gawa | |
| 2014/0089061 A1* | 3/2014 | Vitale | G06Q 30/0633 |
| | | | 705/7.41 |
| 2014/0100985 A1 | 4/2014 | Lenahan et al. | |
| 2015/0127628 A1 | 5/2015 | Rathod | |
| 2015/0199744 A1* | 7/2015 | Tolvanen | G06Q 30/0631 |
| | | | 707/737 |
| 2016/0012431 A1 | 1/2016 | Proctor et al. | |
| 2016/0048871 A1 | 2/2016 | Glass et al. | |
| 2016/0212230 A1* | 7/2016 | Schneider | G06Q 50/01 |
| 2017/0048106 A1* | 2/2017 | Berry | H04L 67/06 |
| 2017/0109448 A1 | 4/2017 | Adamy et al. | |
| 2017/0134883 A1* | 5/2017 | Lekutai | H04W 4/80 |
| 2017/0223065 A1* | 8/2017 | Fan | H04M 3/00 |
| 2018/0034922 A1* | 2/2018 | Gopalan | G06N 20/00 |
| 2018/0218069 A1* | 8/2018 | Rege | G06F 16/337 |
| 2019/0012746 A1 | 1/2019 | Sullivan et al. | |
| 2019/0251593 A1 | 8/2019 | Allouche | |
| 2020/0043103 A1 | 2/2020 | Sheptunov | |

OTHER PUBLICATIONS

IP.com Search Strategy dated Apr. 15, 2021 (Year: 2021).*
Cannella "Artificial Intelligence In Marketing" (2018). Arizona State University. 13 pages.
Malthouse, et al. "Managing customer relationships in the social media era: Introducing the social CRM house" Journal of interactive marketing 27.4 (2013): 270-280. 11 pages.
Karmaker, et al. "A fine grained technique for viral marketing based on social network: A machine learning approach." International Journal of Science and Technology 1.2 (2011) 7 pages.
Liu, et al. "Examining the impact of luxury brand's social media marketing on customer engagement: Using big data analytics and natural language processing" Journal of Business Research (2019). Social media analytics: Channeling the power of the blogosphere for marketing insight. 12 pages.
Domingos, et al. "Mining the network value of customers" Proceedings of the seventh ACM SIGKDD international conference on Knowledge discovery and data mining. 2001. 10 pages.
Melville, et al. "Social media analytics: Channeling the power of the blogosphere for marketing insight" Social media analytics: Channeling the power of the blogosphere for marketing insight. 5 pages.
Rudradeb "Predicting buying behavior using Machine Learning: A case study on Sales Prospecting (Part I)" https://becominghuman.ai/predicting-buying-behavior-using-machine-learning-a-case-study-on-sales-prospecting-part-i-3bf455486e5d?gi=391625bb76b9. Jan. 12, 2018. 12 pages.
Columbus "10 Ways Machine Learning is Revolutionizing Sales" https://www.forbes.com/sites/louiscolumbus/2018/12/26/10-ways-machine-learning-is-revolutionizing-sales/#3ae1ecd63fd1. Dec. 26, 2018. 8 pages.
Norlin, et al. "Identifying New Customers Using Machine Learning" Degree Project in Technology, First Cycle, 15 Credits Stockholm, Sweden 2017. 45 pages.
"About audience targeting" Google, https://support.google.com/google-ads/answer/2497941?hl=en, Last Accessed Apr. 30, 2020. 4 pages.
SMITH "The Definitive Guide to Mastering Google's New AdWords Life Events Targeting" AdEspresso by Hootsuite, https://adespresso.com/blog/adwords-life-events-targeting/. Apr. 30, 2018.
Goowin "Case Study: How Google Ads Life Events Targeting Lifts Brand Interest 175%" Wordstream, https://www.wordstream.com/blog/ws/2017/06/05/google-adwords-life-events-targeting, Oct. 17, 2018. 10 pages.
KIM "5 Ridiculously Powerful Facebook Ad Targeting Strategies" Wordstream, https://www.wordstream.com/blog/ws/2015/01/28/facebook-ad-targeting, Feb. 12, 2020. 12 pages.

* cited by examiner

FACILITATION OF ARTIFICIAL INTELLIGENCE PREDICTIONS OF TELECOMMUNICATIONS CUSTOMERS

TECHNICAL FIELD

This disclosure relates generally to facilitating predictions associated with new telecommunications customers. For example, this disclosure relates to facilitating artificial intelligence-based predictions of new telecommunications customers.

BACKGROUND

Big data is a field that treats ways to analyze, systematically extract information from, or otherwise deal with data sets that are too large or complex to be dealt with by traditional data-processing application software. Data with many cases (rows) offer greater statistical power, while data with higher complexity (more attributes or columns) may lead to a higher false discovery rate. Big data challenges include capturing data, data storage, data analysis, search, sharing, transfer, visualization, querying, updating, information privacy and data source. Big data was originally associated with three key concepts: volume, variety, and velocity. Therefore, big data often includes data with sizes that exceed the capacity of traditional software to process within an acceptable time and value.

Current usage of the term big data tends to refer to the use of predictive analytics, user behavior analytics, or certain other advanced data analytics methods that extract value from data, and seldom to a particular size of data set. Analysis of data sets can find new correlations to spot business trends, prevent diseases, combat crime and so on. Scientists, business executives, practitioners of medicine, advertising and governments alike regularly meet difficulties with large datasets in areas including Internet searches, fintech, urban informatics, and business informatics. Scientists encounter limitations in e-Science work, including meteorology, genomics, connectomics, complex physics simulations, biology and environmental research. The above-described background relating to facilitating predictions associated with new telecommunications customers is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
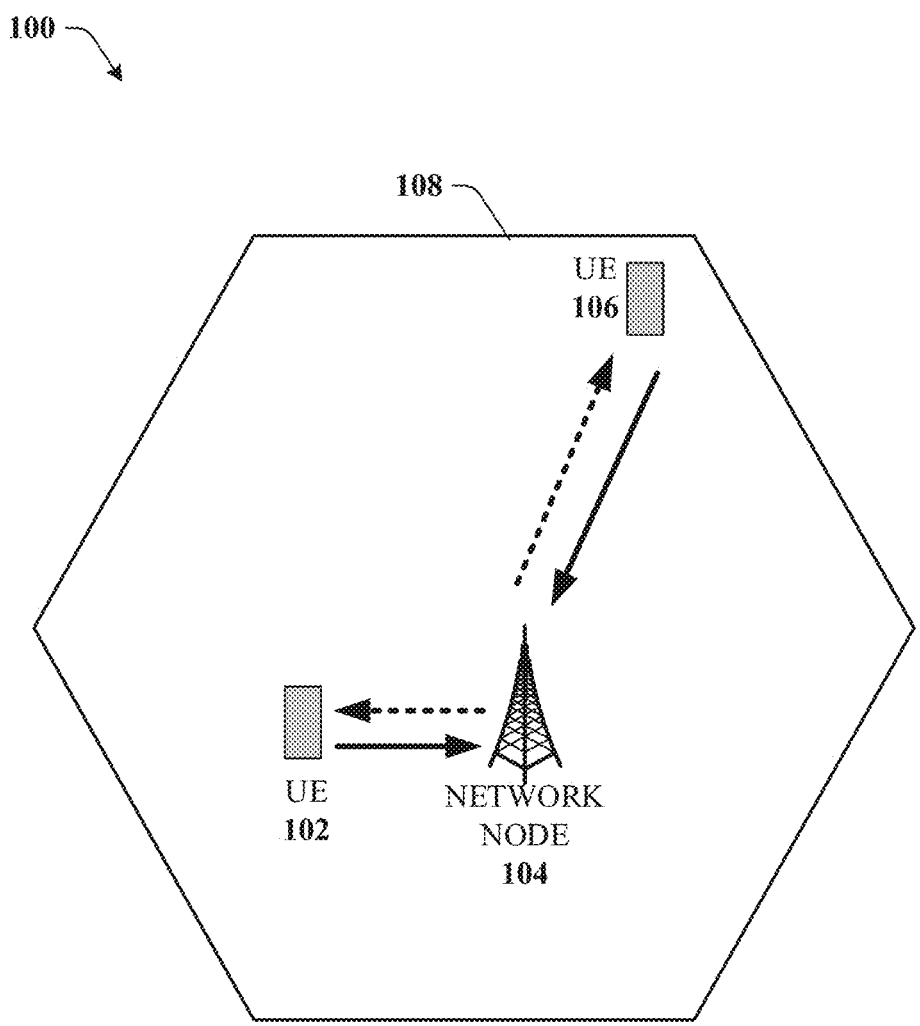
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate predictions associated with new telecommunications customers.

For simplicity of explanation, the methods are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium or a machine-readable storage medium.

It is noted that although various aspects and embodiments are discussed herein with respect to Universal Mobile Telecommunications System (UMTS) and/or Long Term Evolution (LTE), the disclosed aspects are not limited to a UMTS implementation and/or an LTE implementation. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.10 technology. Additionally, substantially all aspects disclosed herein can be exploited in legacy telecommunication technologies.

Described herein are systems, methods, articles of manufacture, and other embodiments or implementations that can facilitate predictions associated with new telecommunications customers. Facilitating predictions associated with new telecommunications customers can be implemented in connection with any type of device with a connection to the communications network such as: a mobile handset, a computer, a handheld device, or the like.

The branches of artificial intelligence (AI), like natural language processing (NLP) to extract the data in conjunction with machine learning (ML) and deep learning (DL) algorithms are proposed in this disclosure to be used as a means to predict the likelihood of a person to be a future subscriber/customer for a service provided by a telecom company as well as predicting the time in the future they might be interested to become a customer. Also, persons with a lower likelihood to buy a product from the company can also be discovered and provided as outputs for further investigations and root cause analysis.

Population growth is one generator of markets for any product including telecom and streaming services. Two major sources of population growth are young people leaving their parents' houses and joining the work market and newcomers to the country (e.g., immigrants). A target of one or more embodiments herein is to discover and provide focused advertisements to these areas of population growth using AI. Also, one or more embodiments target current customers of competing companies that are considering switching to a different provider based on their online info (e.g., conversations about switching to a new provider, getting a job in a new location, etc.) as well as their real estate activities (e.g., buying or renting a new place, applying for a loan, etc.).

An ML/DL system can gather data on prospective customers from publicly available online sources, and provide a list of high likelihood, near future, customers and subscribers as well as a list of people with low interest in the company's products for the purpose of targeted advertising and root cause analysis. In this regard, there is a relationship (statistical pattern) between people's statuses (e.g., entering college, graduating, finding a new job, moving to a new town, marriage, arriving in the country as an immigrant, etc.) and their interest in telecom products. Using ML/DL can reveal the relationship, to be taken advantage of, for the purpose of targeted advertising.

The system can include three main sections: a social media scraper, a labeling unit, and an ML/DL predictor. A web crawler can constantly, or repeatedly, look into online websites and gather information on the status of people and then update a database. An NLP unit in conjunction with a data aggregator can interpret the input data and create a database of records and populate the system's database. The data aggregator can also be responsible for ensuring that the same people from different websites are recognized correctly through comparing specific information like email address, birthday, location, etc. The outcome can provide an ever growing and updated database with life statuses of people with publicly available info online.

One purpose of the labeling unit (LU) is to label every record of the status info created by the social media scraper. Ideally, the LU can recognize everyone who eventually subscribes to a telecom service and add that to the database as a label to each person with a timestamp. The LU can utilize two main methods to accomplish this task: 1) the LU can use a company's database of new and existing customers, and/or 2) the LU can utilize the capabilities of the social media scraper to find out about subscriptions to any telecon services by people based on their posts online (e.g., "enjoying my new subscription to . . . ").

The ML/DL predictor can use the data provided by the social media scraper and the labels assigned to the data by the LU and provide predictions on prospective customers. Since the company has a complete list of customers, that part of the data is considered fully labeled and therefore normal supervised ML/DL processes can be applied to them. Particularly, the predictor can provide a list of people, who are unlikely to buy the company's products, to the business organizations within the company. The business organizations can further investigate the root causes and plan for targeted advertising. However, since the company does not have access to all other telecom companies' customers lists, the data for general interest in telecom products is "partially labeled". Therefore, ML/DL methods for partially labeled data and unsupervised learning algorithms can be applied to the data to provide predictions on the likelihood of buying telecom products in the near future.

One proposed solution provides a method to predict interest of people in telecom products in the near future. Furthermore, the statuses of the individuals gathered and stored in the database, by the social media scraper, can be used for better advertising material. The proposed solution can also provide information on individuals who are less likely to buy the company's products. The combination of this information with predictions on the likelihood prospective customers provides insight on who would buy similar products from the rival companies. Such list can be used for advertising that specifically focuses on the product to captivate and offer lower prices to such customers.

Accordingly, embodiments described herein can be used by a telecom-like companies that have access to a database of people who have subscribed to a certain product (e.g., say over the past month for example). Therefore, the company can partially 'label' the data. Particularly, if the database of people that the company is following online is updating their status according to their discussions and status changes is called 'A', then, a subset of them (e.g., 'A1') can subscribe to a product for which a category can be generated with definite positive outcome. Another subset of people can be the ones who did not subscribe to (or switch to) any product (e.g., 'A2'). A caveat here is that there can be another subset (e.g., 'A3'), who subscribed to (or switched to) a product but from a competing company. Since the company of interest may not have access to this data, the company can rely on the minimal data available online, and therefore generate a very unreliable classification.

It should also be noted that an artificial intelligence (AI) component can facilitate automating one or more features in accordance with the disclosed aspects. A memory and a processor as well as other components can include functionality with regard to the figures. The disclosed aspects in connection with facilitating predictions associated with new telecommunications customers can employ various AI-based schemes for carrying out various aspects thereof. For example, a process for detecting one or more trigger events, reducing a sample size as a result of the one or more trigger events, and modifying one or more reported measurements, and so forth, can be facilitated with an example automatic classifier system and process. In another example, a process for penalizing one category of individual (e.g., likely to purchase, unlikely to purchase, currently in the market, etc.) while preferring another category of individual can be facilitated with the example automatic classifier system and process.

An example classifier can be a function that maps an input attribute vector, $x=(x1, x2, x3, x4, xn)$, to a confidence that the input belongs to a class, that is, $f(x)=\text{confidence}(\text{class})$. Such classification can employ a probabilistic and/or statistical-based analysis (e.g., factoring into the analysis utilities and costs) to prognose or infer an action that can be automatically performed.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to modifying classified groups, modifying one or more reported likelihood measurements, and so forth. The criteria can include, but is not limited to, predefined values, frequency attenuation tables or other parameters, service provider preferences and/or policies, and so on.

In one embodiment, described herein is a method comprising receiving, by a server system comprising a processor, social media data representative of statuses associated with a user identity. In response to the receiving, the method can comprise aggregating, by the server system, the statuses from social media accounts associated with the user identity, resulting in aggregated status data. Based on the aggregated status data, the method can comprise, labeling, by the server system, the statuses with type data representative of a type of status of the user identity. Based on the type data, the method can comprise generating, by the server system, prediction data representative of a propensity of a service to be utilized based on a credential associated with the user identity.

According to another embodiment, a system can facilitate receiving social media data representative of a first status associated with a user identity. In response to the receiving, the system can facilitate aggregating the first status and a second status received via social media account services associated with the user identity. Based on a result of aggregating the first status and the second status, the system can comprise labeling the first status and the second status with type data representative of a type of status applicable to the user identity. Additionally, based on the type of status applicable to the user identity, the system can comprise generating prediction data representative of a likelihood that a service will be utilized in connection with the user identity.

According to yet another embodiment, described herein is a machine-readable medium that can perform the operations comprising receiving first social media data representative of a first status associated with a user identity of a user subscribed to a social media account. The machine-readable medium can perform the operations comprising receiving second social media data representative of a second status associated with the user identity of the user subscribed to the social media account. In response to the receiving of the first social media data and the second social media data, the machine-readable medium can perform the operations comprising aggregating the first status and the second status, resulting in an aggregated status. Additionally, the machine-readable medium can perform the operations comprising associating the aggregated status with type data representative of a type of status of the user identity. Furthermore, based on the type of status of the user identity, the machine-readable medium can perform the operations comprising generating prediction data representative of an inclination that a service will be requested based on a credential associated with the user identity.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the different communication conditions of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
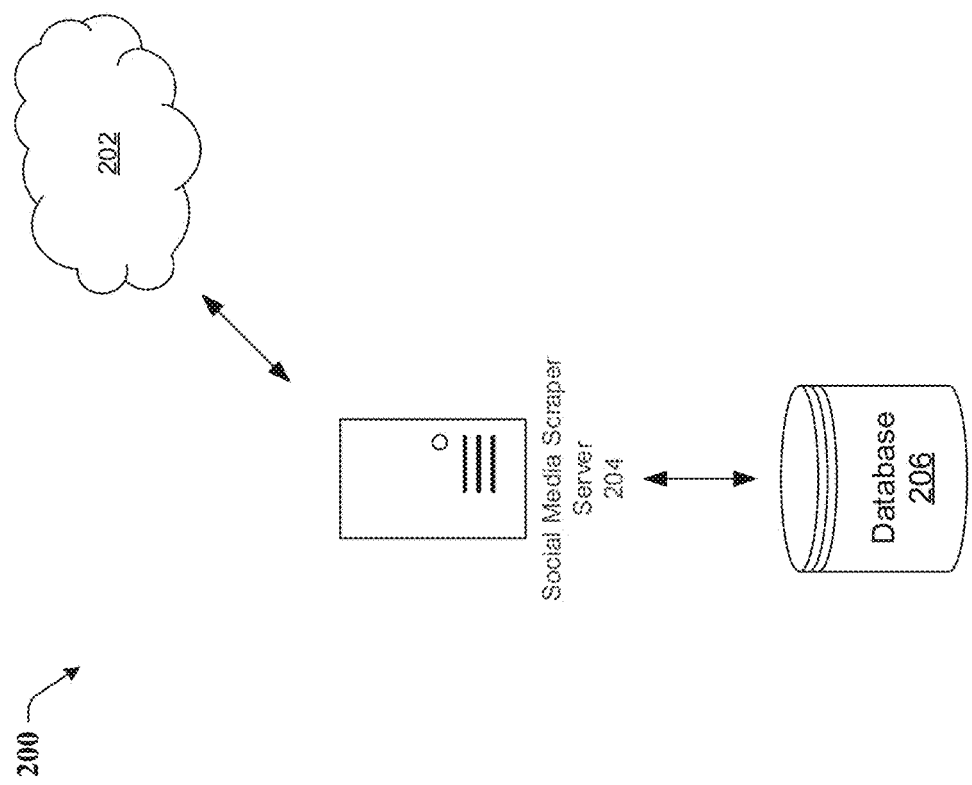
FIG. 2 illustrates an example data aggregation system according to one or more embodiments.

Referring now to FIG. 2, illustrated is an example data aggregation system 200 according to one or more embodiments. The data aggregation system 200 can comprise a social media scraper server 204 that has access to social media and other internet pages via the internet 202. The social media scraper server 204 can scrub social media and other internet pages for publicly availability information, using natural language processing (NLP), to determine who may be in the market for a specific service and/or device. An aggregator component of the social media scraper server 204 can aggregate the various data obtained by the NPL and send the information to a database 206 to be stored for use. Data stored in the database 206 can also be compared to new data obtained by the NLP and used to eliminate duplicitous records.

Figure 3:
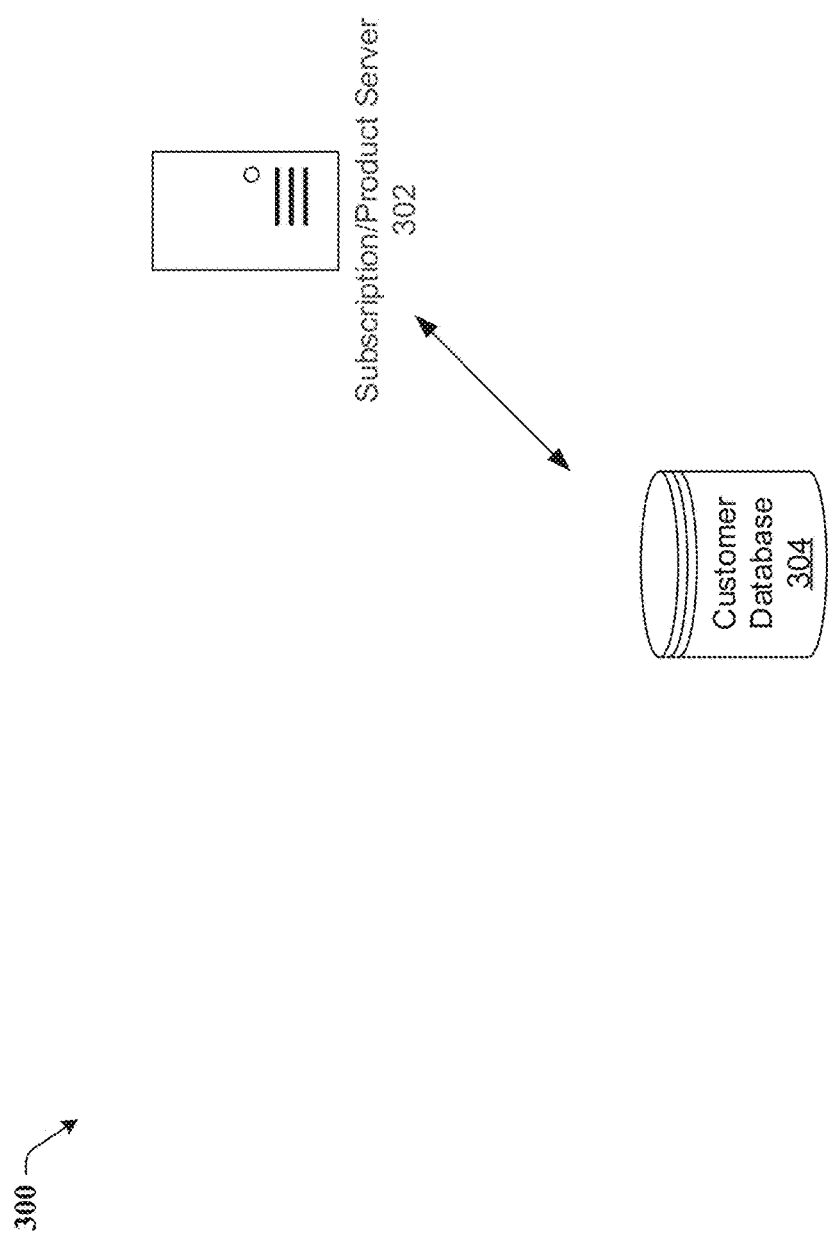
FIG. 3 illustrates an example customer data storage system according to one or more embodiments.

Referring now to FIG. 3, illustrated is an example customer data storage system 300 according to one or more embodiments. The customer data storage system 300 can include a subscription/product server 302 and a customer database 304. When a new customer is obtained by a vendor/company, the vendor/company can keep a record of the transaction. For example, when a telecom company acquires a new customer, the customer's name, address, and other information is obtained by the vendor at the point of sale, which generally communicates with the subscription/product server 302 to keep track of inventory and the transaction. The customer data (e.g., name, date, address, etc.), can then be stored in the customer database 304 for future use and/or access by the vendor/company to facilitate services associated with the customer.

Figure 4:
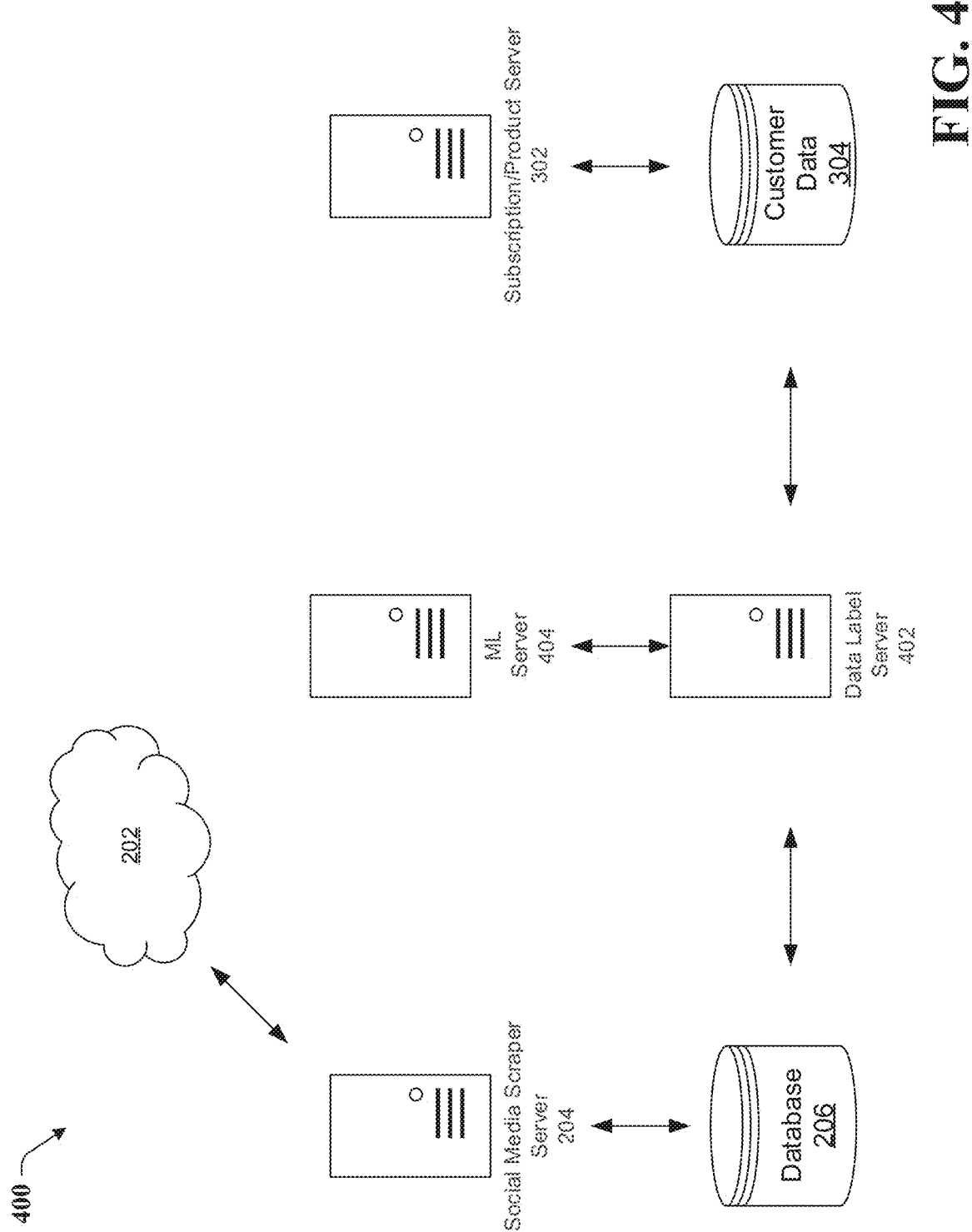
FIG. 4 illustrates an example customer prediction system according to one or more embodiments.

Referring now to FIG. 4, illustrated is an example customer prediction system 400 according to one or more embodiments. The database 206 data and the customer database 304 data can be labeled at a data label server 402. For example, the data label server 402 can cross-reference the individual data received from the database 206 with the customer data received from the customer database 304 and apply labels that are indicative of a customer or non-customer status. Additionally, unsupervised learning methods can be combined with supervised learning methods to predict customer acquisitions and retention. Namely, clustering raw data (e.g., looking for categories (data clusters)) with meaningful high portions of customers (e.g., from the customer database 304 as well as the minimal data on final decisions from online sources received from the database 206) and then assume these categories are the ones with high likelihood for subscription or switching. The persons in these categories that did not buy from the company can be labeled as being most likely to have bought from a competitor or not to have bought at all if the data indicates such.

Supervised ML can utilize the labeled data (e.g., identity info, service info, etc.), that has been received from the data label server 402. Unsupervised learning may not rely on labeling and can produce clusters (e.g., categories) of the data. The ML server 404, can combine the supervised and unsupervised data to determine clusters of data and subsets of the clusters of data of individuals that have subscribed to specific services. For example, by cross-referencing supervised ML data with unsupervised ML data, it can be determined that 20% of the individuals for which public information (e.g., name, status, title, profession, education, etc.) has been attained have subscribed to a vendor service. Consequently, 80% of people are predicted to be interested in the service and have not subscribed to the service. Thus, after this information can be generated by the ML server 404, it can be utilized to direct targeted advertisements to the 80% of people that are predicted to have not subscribed. The ML system can then be trained utilizing this data, in a recursive manner, such that targeted marketing services can be utilized proactively. Thus, the trained ML can then apply newly learned patterns to a new set of information from the online database to identify potential customers. After the potential customers are identified, their contact info (e.g., email, phone number, social media, etc.) can be used to offer them promotional material from the ML server 404.

Figure 5:
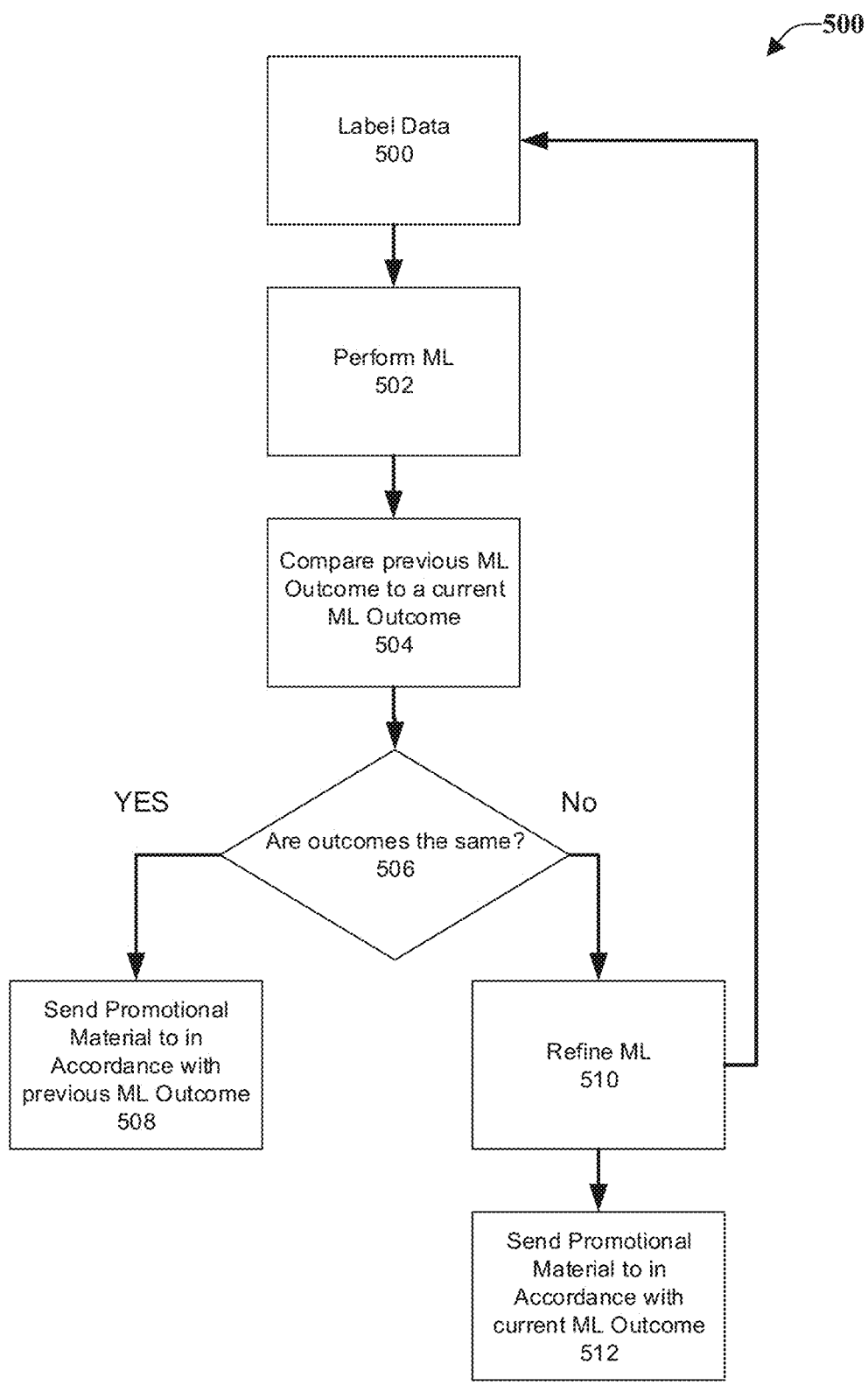
FIG. 5 illustrates an example schematic flow block diagram of an example customer prediction process according to one or more embodiments.

Referring now to FIG. 5, illustrated is an example schematic flow block diagram of an example customer prediction process according to one or more embodiments. The system can comprise a database 206 of individuals, statuses of the individuals, and/or items that they are looking to purchase (e.g., telecom services, phones, etc.). The database 206 can be populated with public information that has been published by persons on the internet (e.g., social media, forums, product boards, etc.). Service providers can maintain a database of customers (e.g., customer database 304) that have recently purchased new services and/or products. These two databases can be cross-referenced to determine which individuals that were looking for new products/services have actually purchased such. At block 500, the aforementioned information can be labeled via supervised ML at the data label server 402. When newly scrubbed data from social media is sent to the data labeling server 402 at block 502, unsupervised ML can be performed to train the system based on insights that can be ascertained and/or predictions made from the data that was acquired via the NLP in comparison to the actual customer data of the vendor, which can also be received by the data labeling server 402. For example, during the labeling process unsupervised ML clusters of data can be compared to supervised ML categories of data to determine correlations between the two.

Thus, at block 504, a previous ML outcome (e.g., supervised ML) can be compared to a current ML outcome (e.g., unsupervised ML) to facilitate training of the ML system. For example, the previous supervised ML outcome can indicate that on a yearly average, 70% of identified people do not subscribe to a service and generate a category for such. However, if it is determined, via unsupervised ML, that in August only 60% of identified people do not subscribe to the service, then the supervised ML data can be compared to the unsupervised ML data at block 504 to correlate the increase in subscriptions to the school year beginning (based on the NLP scrub), such that it can be predicted that more students subscribe to the service at the beginning of the school year. However, when August of the next year comes, the same type of analysis can be performed, and if the outcomes are the same at block 506, then promotional materials can be sent in accordance with the previous ML outcome at block 508. However, if the outcomes are not the same, then the ML can be refined (e.g., trained with the current outcome) at block 510, and the promotional materials can be sent out in accordance with the current outcome at block 512. Thus, the newly trained ML data can be used to perform any future ML that can take place at block 500.

Figure 6:
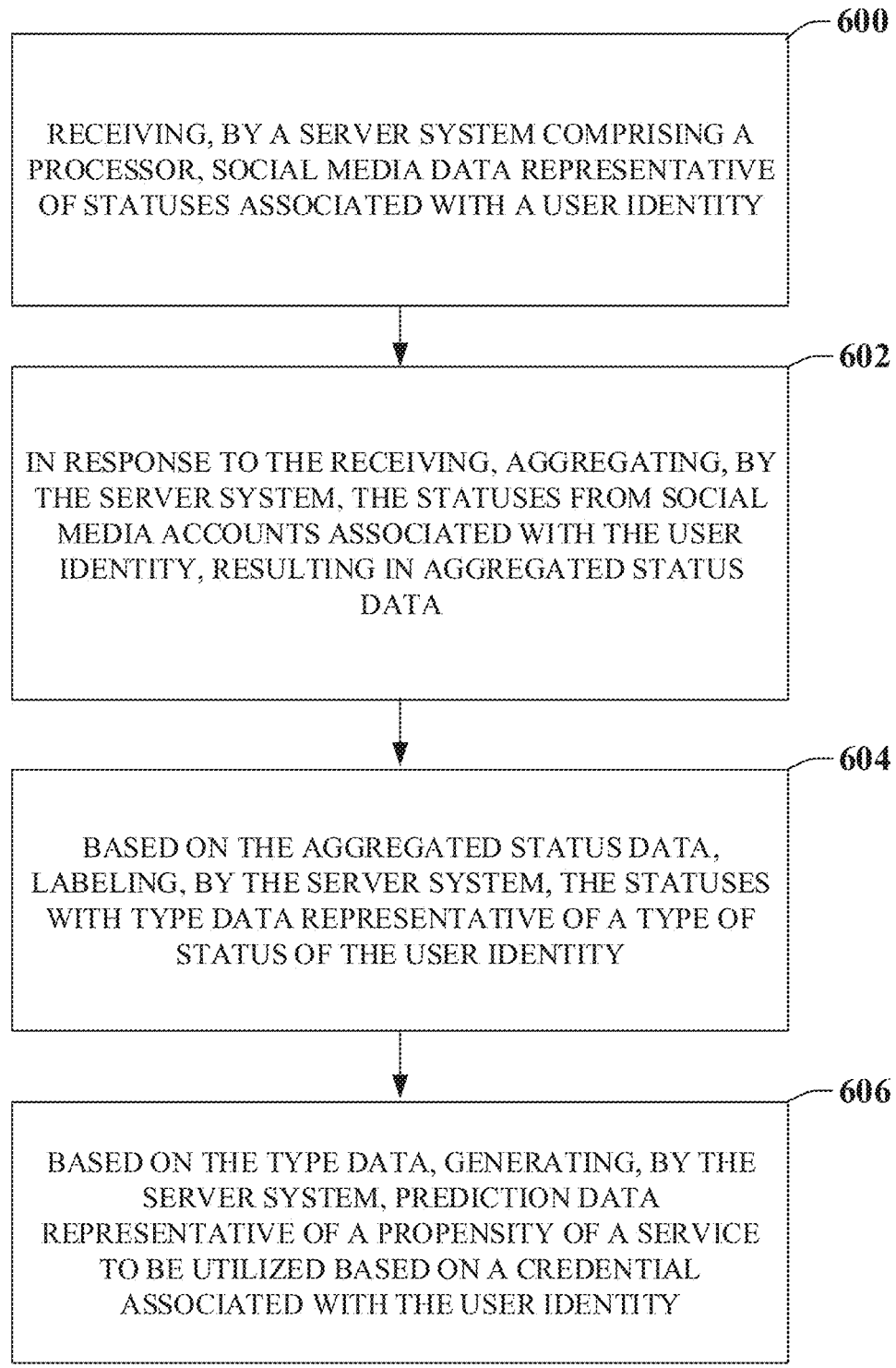
FIG. 6 illustrates an example schematic system block diagram for method for customer prediction according to one or more embodiments.

Referring now to FIG. 6, illustrated is an example schematic system block diagram for method for customer prediction according to one or more embodiments. At element 600, the method can comprise receiving, by a server system comprising a processor, social media data representative of statuses associated with a user identity. At element 602, in response to the receiving, the method can comprise aggregating, by the server system, the statuses from social media accounts associated with the user identity, resulting in aggregated status data. Based on the aggregated status data, at element 604, the method can comprise, labeling, by the server system, the statuses with type data representative of a type of status of the user identity. Based on the type data, at element 606, the method can comprise generating, by the server system, prediction data representative of a propensity of a service to be utilized based on a credential associated with the user identity.

Figure 7:
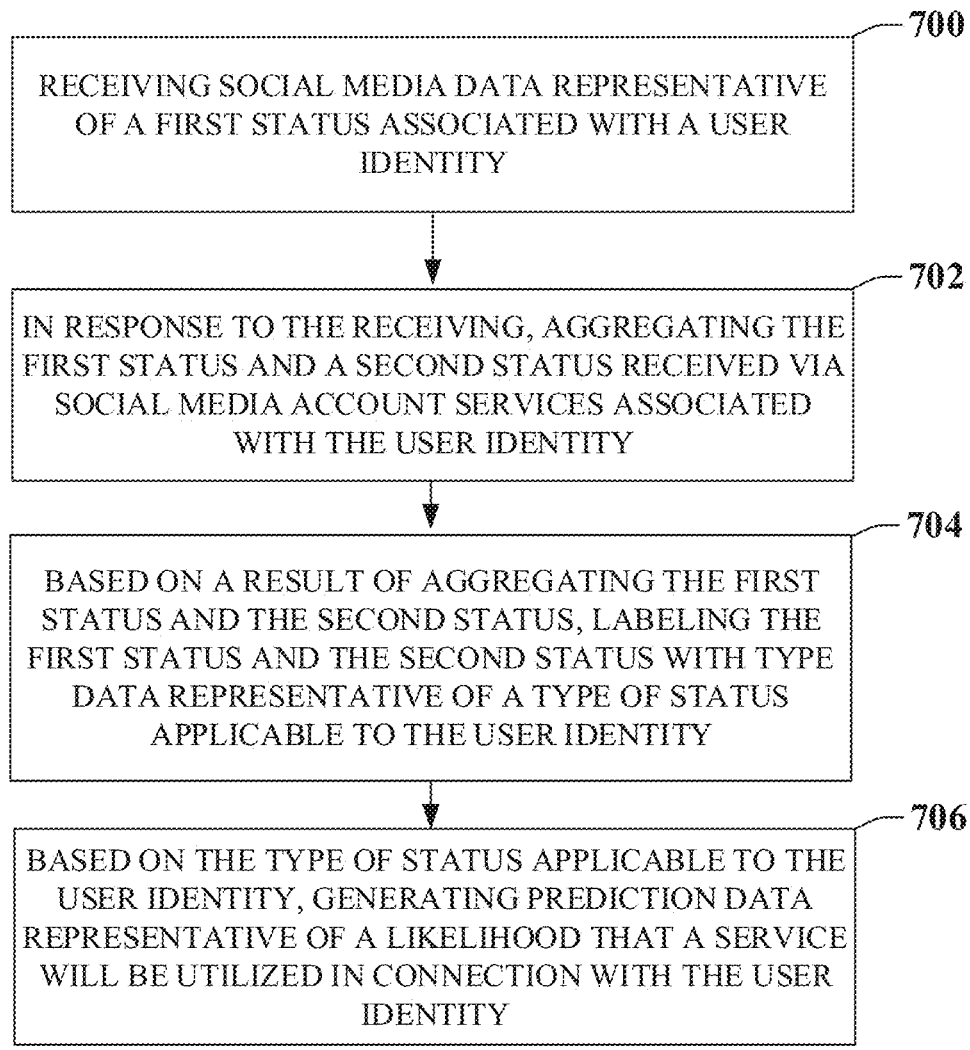
FIG. 7 illustrates an example schematic system block diagram for a system for customer prediction according to one or more embodiments.

Referring now to FIG. 7, illustrated is an example schematic system block diagram for a system for customer prediction according to one or more embodiments. At element 700, the system can facilitate receiving social media data representative of a first status associated with a user identity. In response to the receiving, at element 702, the system can facilitate aggregating the first status and a second status received via social media account services associated with the user identity. Based on a result of aggregating the first status and the second status, at element 704, the system can comprise labeling the first status and the second status with type data representative of a type of status applicable to the user identity. Additionally, at element 706, based on the type of status applicable to the user identity, the system can comprise generating prediction data representative of a likelihood that a service will be utilized in connection with the user identity.

Figure 8:
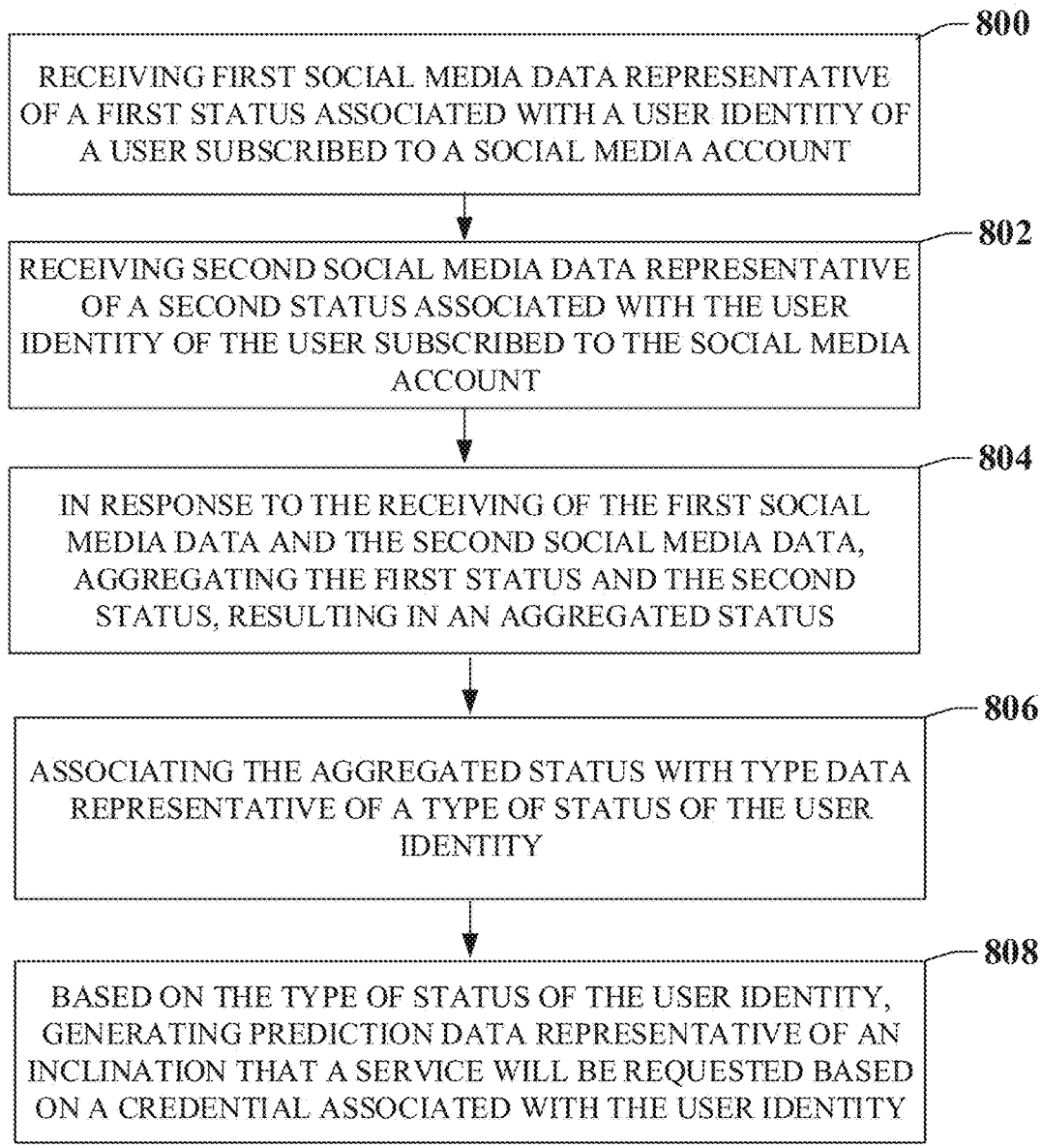
FIG. 8 illustrates an example schematic system block diagram for a machine-readable medium for customer prediction according to one or more embodiments.

Referring now to FIG. 8, illustrated is an example schematic system block diagram for a machine-readable medium for customer prediction according to one or more embodiments. At element 800, the machine-readable medium can perform the operations comprising receiving first social media data representative of a first status associated with a user identity of a user subscribed to a social media account. At element 802, the machine-readable medium can perform the operations comprising receiving second social media data representative of a second status associated with the user identity of the user subscribed to the social media account. In response to the receiving of the first social media data and the second social media data, at element 804, the machine-readable medium can perform the operations comprising aggregating the first status and the second status, resulting in an aggregated status. Additionally, at element 806, the machine-readable medium can perform the operations comprising associating the aggregated status with type data representative of a type of status of the user identity. Furthermore, at element 808, based on the type of status of the user identity, the machine-readable medium can perform the operations comprising generating prediction data representative of an inclination that a service will be requested based on a credential associated with the user identity.

Figure 9:
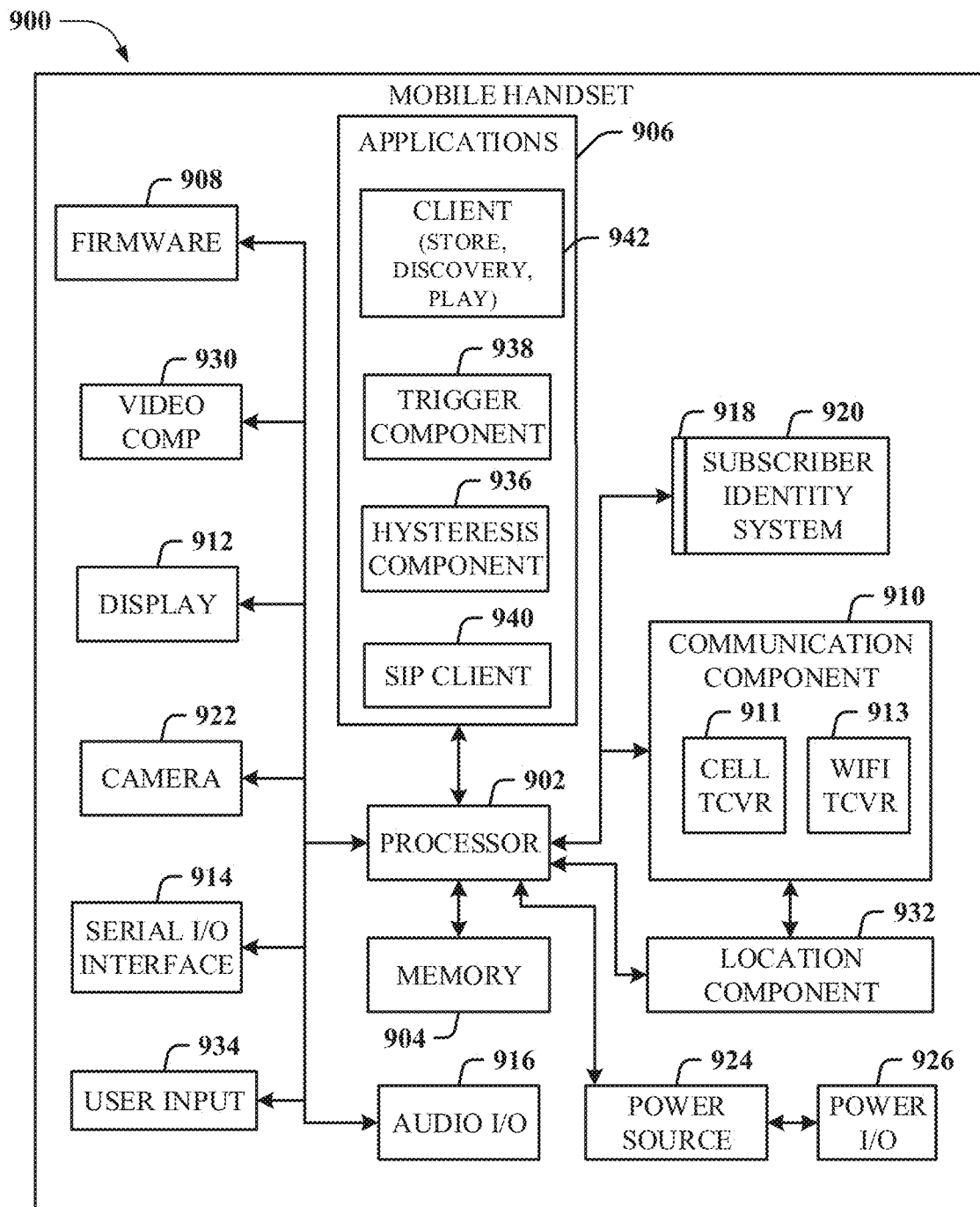
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
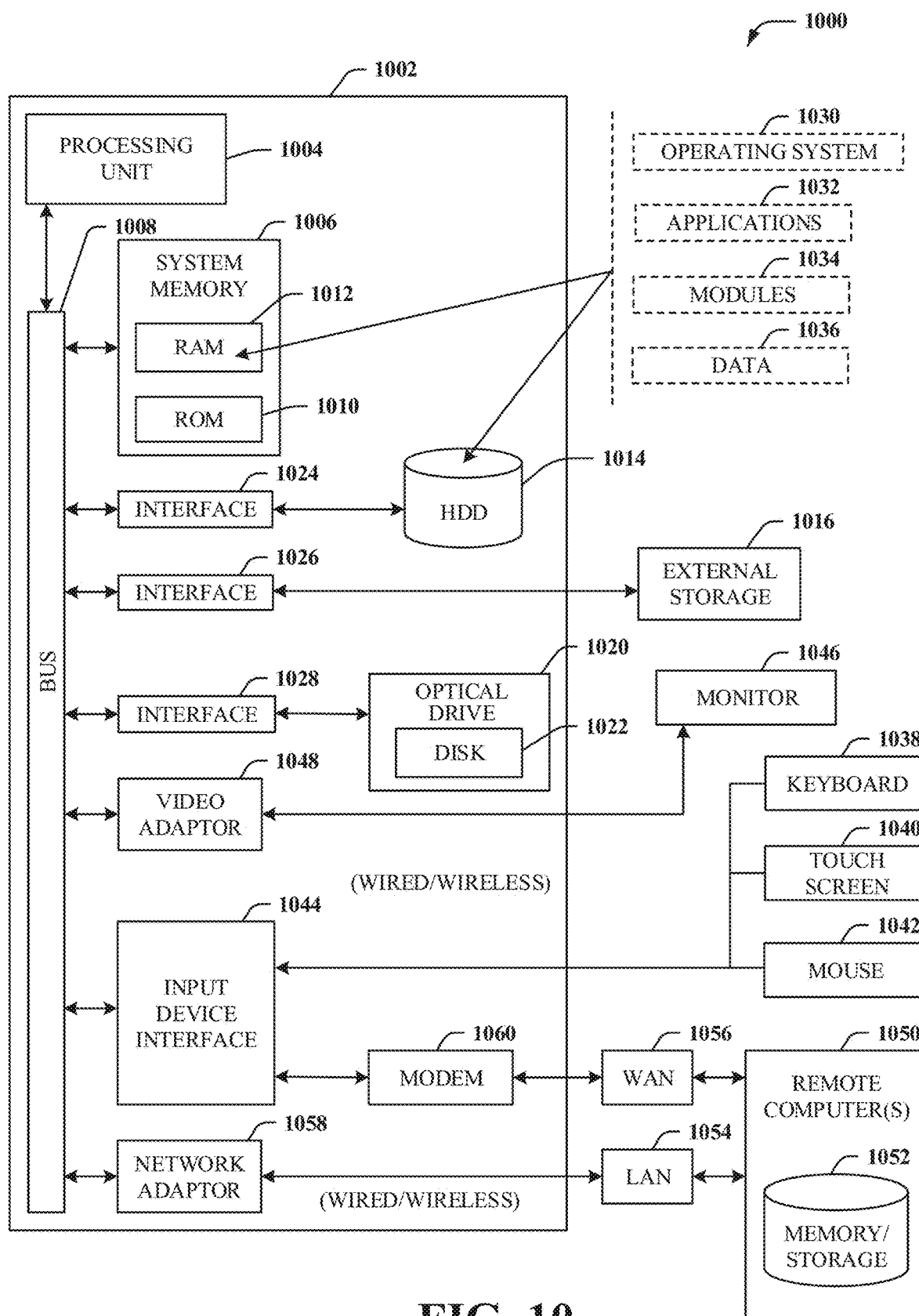
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, by a server system comprising a processor, social media data representative of statuses associated with a first user identity;
in response to the receiving, aggregating, by the server system, the statuses from social media accounts associated with the first user identity, resulting in aggregated status data;
based on a model generated from machine learning applied to previous social media data representative of statuses associated with second identities other than the first user identity and based on the aggregated status data, labeling, by the server system, the statuses with type data representative of a type of status of the first user identity, wherein the model comprises supervised machine learning data and unsupervised machine learning data utilized to determine a percentage of the second identities that have been determined to have subscribed to a service;
based on the type data, generating, by the server system, prediction data representative of a propensity of a service to be utilized based on a credential associated with the first user identity;

matching, by the server system, first identity data representative of the first user identity to second identity data representative of the first user identity, wherein the second identity data is obtained from a different source than a source from which the first identity data is obtained, wherein the first identity data comprises a previous location associated with the first user identity, and wherein the second identity data is determined to be representative of the previous location; and in response to generating the prediction data, sending, by the server system, the prediction data to a user equipment for output to a display screen of the user equipment to the second user identity.

2. The method of claim 1, wherein the service is a telecommunications service associated with a telecommunications service provider, wherein the labeling comprises labeling via a supervised machine-learning procedure, and wherein the generating the prediction data is performed in response to comparing the type data to unsupervised data from an unsupervised machine-learning procedure.

3. The method of claim 2, wherein the telecommunications service is a first telecommunications service, and further comprising:

prior to the labeling, comparing, by the server system, the first telecommunications service to a second telecommunications service.

4. The method of claim 1, wherein the matching further comprises:

comparing potential customer data to actual customer data representative of an actual customer.

5. The method of claim 4, wherein the first identity data and the second identity data are representative of an email address associated with the first user identity.

6. The method of claim 4, wherein the first identity data and the second identity data are representative of a birthday associated with the first user identity.

7. The method of claim 1, further comprising:

determining, by the system, potential customer data representative of a customer device.

8. A system, comprising:

a processor; and a memory that stores executable instructions that, when executed by the processor, facilitate performance of operations, comprising:

receiving social media data representative of a first status associated with a first user identity;

in response to the receiving, aggregating the first status and a second status received via first social media account services associated with the first user identity;

based on a model generated from machine learning applied to previous social media data representative of statuses associated a second user identity other than the first user identity and based on a result of aggregating the first status and the second status, labeling the first status and the second status with type data representative of a type of status applicable to the first user identity, wherein the model comprises supervised machine learning data and unsupervised machine learning data utilized to determine a percentage of identities that have been determined to have subscribed to a service;

based on the type of status applicable to the first user identity, generating prediction data representative of a likelihood that a service will be utilized in connection with the first user identity;

matching first identity data representative of the first user identity to second identity data representative of the first user identity, wherein the second identity data is obtained from a different source than a source from which the first identity data is obtained, wherein the first identity data comprises a previous location associated with the first user identity, and wherein the second identity data is determined to be representative of the previous location; and in response to generating the prediction data, sending the prediction data to a user equipment for output to a display screen of the user equipment to the second user identity.

9. The system of claim 8, wherein the type data is labeled during a supervised machine-learning process, and wherein the operations further comprise:

comparing the type data to unsupervised machine-learning data to determine a correlation between the type data and the unsupervised machine-learning data preceding the generating of the prediction data.

10. The system of claim 8, wherein the operations further comprise:

based on the prediction data, determining threshold low potential customer data representative of a customer device, associated with a customer identity of a threshold low potential customer, to which not to send advertisement data representative of an advertisement of the service.

11. The system of claim 8, wherein the operations further comprise:

based on the prediction data, determining potential customer data representative of a customer device, associated with a potential customer identity of a potential customer, to which to send advertisement data representative of an advertisement of the service; and in response to determining the potential customer data, comparing the potential customer data to actual customer data representative of an actual customer that has completed a previous purchase.

12. The system of claim 11, wherein the operations further comprise:

in response to comparing the potential customer data to the actual customer data, determining that the potential customer is the actual customer.

13. The system of claim 11, wherein the operations further comprise:

in response to comparing the potential customer data to the actual customer data, determining that the potential customer is not the actual customer.

14. The system of claim 13, wherein the operations further comprise:

in response to determining that the potential customer is not the actual customer, sending, to the customer device, marketing content via the first social media account services.

15. A non-transitory machine-readable medium, comprising executable instructions that, when executed by a processor, facilitate performance of operations, comprising:

receiving first social media data representative of a first status associated with a first user identity of a first user subscribed to a first social media account;

receiving second social media data representative of a second status associated with the first user identity of the user subscribed to the first social media account;

based on a model generated from machine learning applied to previous social media data representative of statuses associated with identities other than the first user identity and in response to the receiving of the first social media data and the second social media data, aggregating the first status and the second status, resulting in an aggregated status, wherein the model comprises supervised machine learning data and unsupervised machine learning data utilized to determine a percentage of the second identities that have been determined to have subscribed to a service;

associating the aggregated status with type data representative of a type of status of the first user identity;

based on the type of status of the first user identity, generating prediction data representative of an inclination that a service will be requested based on a credential associated with the first user identity;

matching first identity data representative of the first user identity to second identity data representative of the first user identity, wherein the second identity data is obtained from a different source than a source from which the first identity data is obtained, wherein the first identity data comprises a previous location associated with the first user identity, and wherein the second identity data is determined to be representative of the previous location; and in response to generating the prediction data, sending the prediction data to a user equipment for output to a display screen of the user equipment to the second user identity.

16. The non-transitory machine-readable medium of claim 15, wherein the social media account is a first social media account, wherein the user identity is a first user identity, and wherein the operations further comprise:
   comparing the first user identity to a second user identity associated with a second social media account.

17. The non-transitory machine-readable medium of claim 16, wherein the operations further comprise:
   based on a result of the comparing, determining that the first user identity is not the second user identity.

18. The non-transitory machine-readable medium of claim 16, wherein the operations further comprise:
   based on a result of the comparing, determining that the first user identity is the second user identity.

19. The non-transitory machine-readable medium of claim 18, wherein the operations further comprise:
   based on the determining, generating the type data, wherein the type data is of a match type indicative of a match between the first user identity and the second user identity.

20. The non-transitory machine-readable medium of claim 19, wherein the operations further comprise:
   in response to generating the type data, generating advertisement data representative of an advertisement to be transmitted to a user device associated with the first user identity.

* * * * *